United States Patent [19]

Olive et al.

[11] Patent Number: 4,918,856
[45] Date of Patent: Apr. 24, 1990

[54] INSECT TRAP FOR FLEAS OR THE LIKE

[76] Inventors: Billy B. Olive, Rte. 1, Box 166, Durham, N.C. 27705; Clarence O. Williams, 3617 Sheffield Dr., Rocky Mount, N.C. 27801

[21] Appl. No.: 357,048

[22] Filed: May 24, 1989

[51] Int. Cl.⁵ .............................................. A01M 1/04
[52] U.S. Cl. .................................................... 43/113
[58] Field of Search .................... 43/113, 114, 42.33

[56] References Cited

U.S. PATENT DOCUMENTS 3,023,539  3/1962  Emerson .............................. 43/114
4,117,624  10/1978  Phillips ............................... 43/114
4,610,103  9/1986  Steinman ........................... 43/42.33
4,638,584  1/1987  Lindsay ............................. 43/42.33
4,741,120  5/1988  Cota et al. ......................... 43/42.33

Primary Examiner—M. Jordan
Attorney, Agent, or Firm—Olive & Olive

[57] ABSTRACT

An insect trap utilizes a self-contained, gradually decaying, radiant light source which is continuously operative independent of any combustible fuel or electrical energy supply and means to position the light source near a trapping device for trapping insects attracted to the light source.

20 Claims, 2 Drawing Sheets 4,918,856

INSECT TRAP FOR FLEAS OR THE LIKE

FIELD OF INVENTION

The present invention generally relates to insect traps. More specifically the invention is directed to a trap for luring and exterminating insects, particularly fleas, by use of a self-activating, gradually decaying, light source.

BACKGROUND ART

It is known in the art of insect traps to utilize an electrically energized light source for attracting insects and a sticky substance beneath the light source for trapping the insects. It has also been known to suspend an electrically energized light source of a selected color beneath a reflective surface and direct the reflected light towards a sticky substance to trap insects. However, all such forms of electrically energized insect traps have the disadvantage of requiring an electric power source and the cautions that must accompany the use of any type of electrically powered insect trap. An oil lamp has also been used as an insect trap light source but has the disadvantage, among others, of requiring a source of oil and replenishment of the oil or other fuel.

Chemiluminescent and tritium tube light sources have been employed as emergency light sources. Certain special forms of chemiluminescent light sources have also been employed as a submersible lure for attracting fish. However, so far as is known neither the chemiluminescent type of light source or the type of light source provided by a sealed glass tube internally coated with phosphor and filled with tritium gas or any similar self-contained, self-activated light source has been recognized as a useful light source for luring and trapping insects, particularly non-flying, wingless fleas.

DISCLOSURE OF INVENTION

In accordance with the invention applicants provide an insect trap of broad application but designed primarily for entrapment and extermination of non-flying, wingless fleas. The insect trap of the invention in one embodiment comprises a sticky liquid or other sticky substance accessible to a source of fleas to be trapped and a light source in the form of a chemiluminescent light emitting tube, light emitting tritium tube or any similar self-activated, self-contained light source positioned so as to attract fleas or other insects to the sticky substance or other trapping mechanism. Various embodiments illustrate various forms of associating the light source with the trapping surface or other trapping mechanism. The need for an electrical or fuel supply for the light source has thus been eliminated and a relatively inexpensive, relatively long life, self-contained insect trap has been achieved all of which is believed to represent a significant advance in the art.

DESCRIPTION OF PREFERRED EMBODIMENTS

Figure 1:
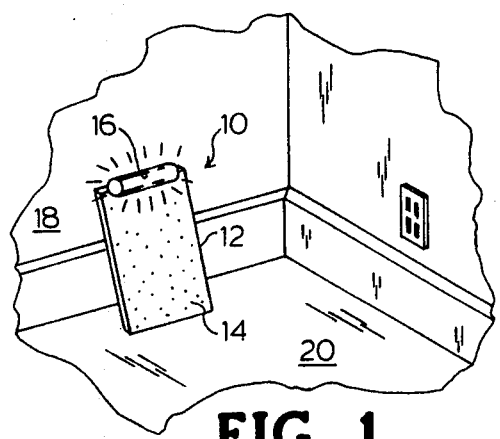
FIG. 1 is a pictorial view of a first embodiment of the invention insect trap in a first form without a housing.

Referring to the drawings, an insect trap 10 constructed in accordance with the first form of a first embodiment of the present invention comprises a relatively rigid panel 12 formed of paperboard or the like having a flypaper like sticky substance 14 and a self-activated light source 16. Light source 16 is secured to the panel 12 by means of an adhesive, not shown, or other suitable means and in FIG. 1 the light source 16 is illustrated as being secured to one extreme end of panel 12. In the illustration of FIG. 1, panel 12 is illustrated as being tilted against a room wall surface 18 such that fleas on the floor 20 of the same room tend to jump towards light source 16 to be trapped and exterminated by means of the sticky trapping surface 14 it being desirable that source 16 be at least slightly elevated relative to the floor 20 on which the fleas reside.

In the first and all other embodiments to be described herein, the light source 16 is intended to represent a self-activated, self-contained, gradually decaying, light source operable independent of any electric or fuel source such as provided by a chemiluminescent light source as described, for example in U.S. Pat. No. 3,576,987 and preferably of a green color suited to attracting fleas and is illustrated as being in tubular form. Other colors, though discovered to be less effective, are deemed to be within the scope of the invention. Another type of self-activated light source suited to the invention is the tritium tube type light source such as sold by Saunders Roe Development, Ltd., of Middlesex, England. A chemiluminescent tube sold under the trademark "Cyalume" by the American Cynamid Company and typically for use as a submersible fishing lure when obtained in the form which gives off a green color or glow and in a larger size than is typically used for a fishing lure, when mounted in the manner of FIG. 1 has proven to be effective for purposes of the invention. A 5" long, ½" outside diameter "Cyalume" light stick has been employed. A "Betalight" glass sealed tritium tube about 2¾" long and ¼" outside diameter made by Saunders Roe Development, Ltd., and typically sold as an emergency light source for signs has also proven effective for the same purpose. Such tubes typically radiate radially outwardly in all directions unless purposely shielded.

Figure 2:
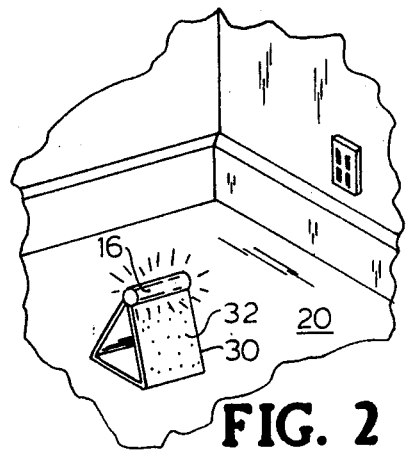
FIG. 2 is a pictorial view of a second form of the first embodiment of the insect trap.

In another form of the first embodiment shown in FIG. 2, a triangular support structure 30 formed of a relatively rigid panel material such as paperboard is coated with a suitable sticky substance 32 and the light source 16 is suitably supported at the apex of the triangular support 30 as illustrated in FIG. 2 and a few inches, e.g., three inches, above the floor 20. In use, as pictorially illustrated in FIG. 2, the support structure 30 rests on the floor surface 20 enabling the fleas to jump from either side of the support structure 30 towards the elevated light source 16 onto the trapping surface 32 on the side illustrated or on the opposite side which is provided with a similar trapping substance though not shown in FIG. 2.

Figure 3:
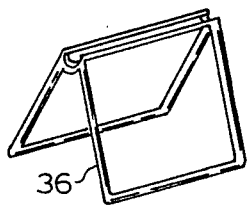
FIG. 3 is a pictorial view of a light source support for a third form of the first embodiment of the insect trap.
Figure 4:
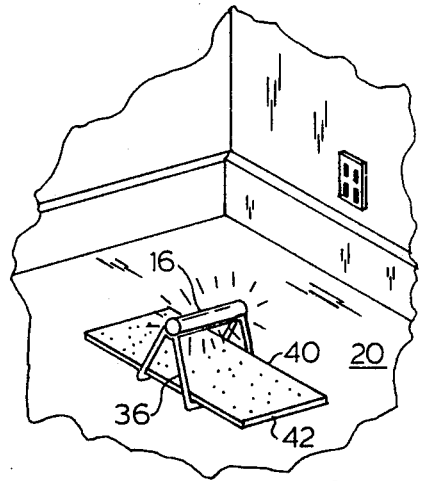
FIG. 4 is a pictorial view of the third form of the first embodiment of the insect trap utilizing the light source support of FIG. 3.

In the form of the first embodiment in FIGS. 3 and 4, the tubular light source 16 is removably supported at an elevated position, e.g., three inches above floor level, on a wire formed leg support 36, above a rigid panel member 40 provided with a trapping substance 42. In the form of FIG. 4, it will be understood that the fleas on the floor 20 tend to jump towards the elevated light source 16 to be trapped by the trapping substance 42.

Figure 5:
FIG. 5 is a pictorial view of a fourth form of the first embodiment of the insect trap.

In the fourth form of the first embodiment in FIG. 5, two opposed panels 22, 24 having outer sticky surfaces 26, 28 (not shown) drape on a support stick 27 below the light source 16. This form of the invention might be useful near a dog kennel or the like.

Figure 6:
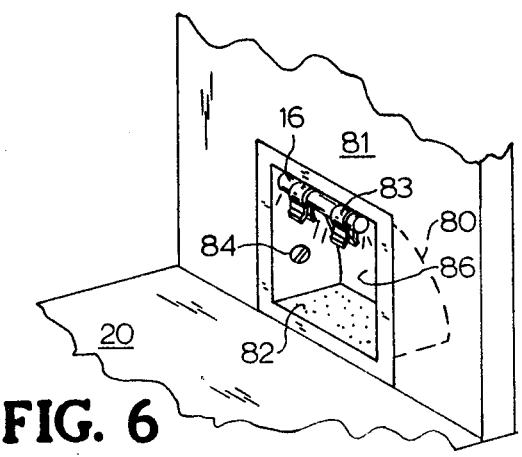
FIG. 6 is a pictorial view of a second embodiment of the insect trap utilizing a first form of housing.

In various forms of a second embodiment the light source is supported in a housing. In the first form of the second embodiment illustrated in FIG. 6, the light source 16 is removably supported by clips 83 in a housing comprising a wall mounted receptacle 80 which also supports within the receptacle 80 a replaceable sheet of flypaper 82 or other sticky substance. As illustrated in FIG. 6, the receptacle 80 is mounted within the wall 81 and slightly above floor surface 20 such that the fleas are able to hop towards the light source 16 to be trapped by the sticky substance 82. A reflective surface 86, preferably of a green color enhances the trapping effect. Receptacle 80 is secured by means of screws 84 and fixed to the wall 81.

Figure 7:
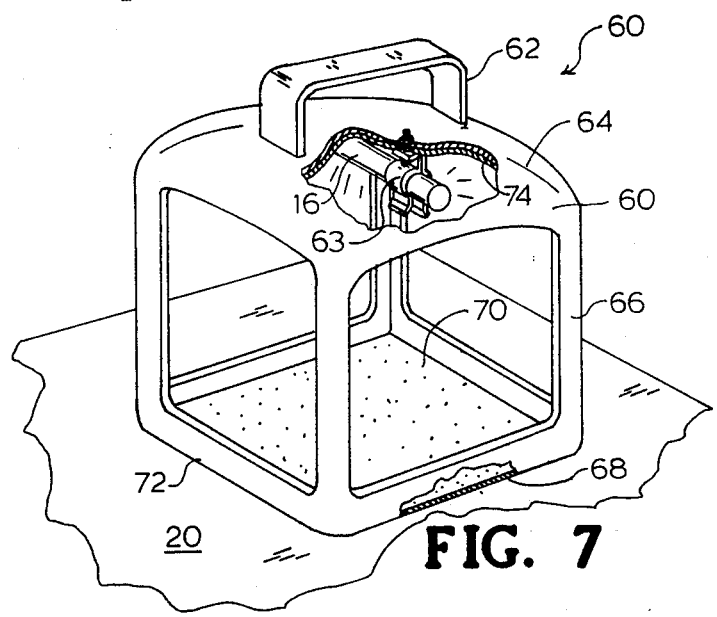
FIG. 7 is a pictorial view of the second embodiment of the insect trap utilizing a second form of housing.

In a second form of housing for the second embodiment illustrated in FIG. 7, a carrier 60 molded of plastic, metal or other suitable material includes a handle 62 secured to the top 64, four supporting corner legs 66 and a bottom wall 68 on which is placed a sheet of replaceable sticky flypaper 70 or the like. The light source 16 is removably suspended below the top 64 in clips 63, 65 only one of which is shown and below a reflective material 74, preferably of a green color, such as aluminum green sheet or the like and which is secured to the inner surface of top 64 above the light source 16 so as to direct light from light source 16 towards the trapping surface 70. The support 60 has four open sides as illustrated such that when placed on any floor 20, ground surface or the like having a collection of fleas, the fleas are allowed to jump over the shallow walls 72 above the floor 68 of the carrier 60 to be trapped by the sticky substance 70.

Figure 8:
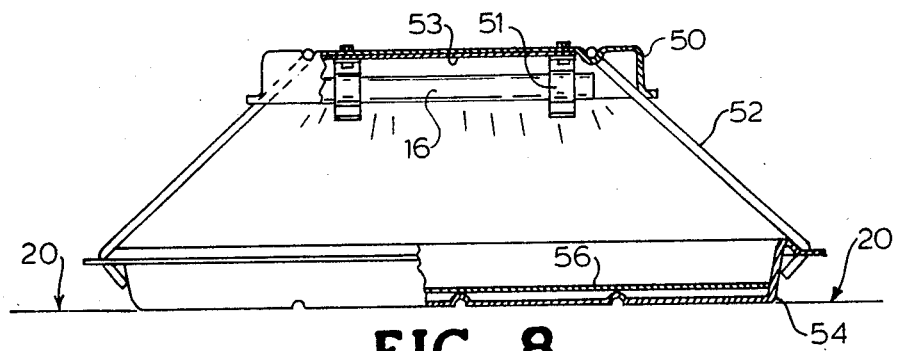
FIG. 8 is a pictorial view of the second embodiment of the invention utilizing a third form of housing.

In a third form of housing for the second embodiment as seen in FIG. 8, the light source 16 is removably suspended by clips 51 beneath a cover 50 supported by wire formed supports 52 above a shallow pan 54 containing a replaceable sheet of sticky flypaper 56 or the like. U.S. Pat. No. 4,686,789, incorporated herein by reference, may be referred to for this type of shallow pan-cover-support configuration. Cover 50 has an inner reflective surface 53, preferably green, so as to reflect and supplement the radiated light produced by the light source 16 towards the trapping surface 56. In use, the shallow pan 54 resting on the floor 20 enables any fleas on floor 20 to sense both the radiated and reflected light and jump towards the light source 16 to be trapped by the trapping surface 56. In other forms of the invention as illustrated, for example, in FIGS. 6 and 7, both directly radiated and reflected light is produced and the fleas are able to sense both forms of radiation. In some experiments, the radiation produced by an extensively used light source 16 of the invention even though not visible to the human eye as light has nevertheless continued to attract and trap fleas even though at a rate substantially less than when the light source 16 is fresh and produces a light visible to the human eye. Thus, the "color" may at times be invisible but effective. The fact that the light source is tubular and radiates in all directions around the tube periphery is also helpful.

In summary, an improved insect trap has been provided which is particularly useful for trapping non-flying, wingless fleas. The improved insect trap is effective independent of any electrical or fuel supply and thus avoids all the disadvantages of such requirement. An economical, easily produced, self-activated and self-contained trap is obtained. The trap may be made in a single use, inexpensive, disposable form as in FIGS. 1–5 or in a form so as to be reusable, as in FIGS. 6–8, by replacing the light source and sticky paper when needed.

While primarily directed to trapping wingless, non-flying insects, the invention contemplates that any insect attracted to the unique light source of the invention could be trapped either by the sticky trapping surface illustrated or by other means such as a funnel trap or the like suited to the particular insect and its type of movement whether in the nature of hopping or flying. Based on those experiments thus far completed it has been observed that the gradually decaying, chemiluminescent light source of the type described and in the form presently commercially available will have a substantially shorter effective life for attracting insects, measured in hours, than will the tritium tube light source which may prove to have an effective life of several years. With an intense concentration of fleas however, a substantial number can be trapped with either light source in a very short period of time. Either light source gives the advantage of being self-contained and operable independent of an electrical or fuel supply and to be readily replaceable in the reusable form of the invention trap.

What is claimed is:

1. A trap for catching insects, comprising:
   (a) insect trapping means comprising a sticky landing surface and means to support said sticky landing surface in a position accessible to live insects to be trapped and killed by contacting said surface; and
   (b) a self-contained, gradually decaying, radiant light source continuously operative independent of a combustible fuel or electrical energy supply and positioned proximate said insect trapping means to provide a luring color of light uniquely suited to attracting the insects to be trapped to said sticky landing surface.

2. A trap for catching insects as claimed in claim 1 wherein said light source comprises a tubular chemiluminescent light source.

3. A trap for catching insects as claimed in claim 1 wherein said light source comprises a tritium tube light source.

4. A trap for catching insects as claimed in claim 1 wherein said insects comprising wingless, non-flying insects such as fleas, said luring color is a color attractive to said wingless, non-flying insects and said means to support said sticky landing surface makes said sticky landing surface accessible to said wingless, non-flying insects.

5. A trap for catching insects as claimed in claim 1 wherein said light source comprises a tubular chemiluminescent light source, said insects comprise wingless, non-flying insects such as fleas, said luring color is a color attractive to said wingless, non-flying insects and said means to support said sticky landing surface makes said sticky landing surface accessible to said wingless, non-flying insects.

6. A trap for catching insects as claimed in claim 1 wherein said light source comprises a tritium tube light source, said insects comprise wingless, non-flying insects such as fleas, said luring color is a color attractive to said wingless, non-flying insects and said means to support said sticky landing surface makes said sticky landing surface accessible to said wingless, non-flying insects.

7. A trap for catching insects as claimed in claim 1 wherein said means to support said sticky landing surface also supports said light source.

8. A trap for catching insects as claimed in claim 1 wherein said light source comprises a tubular chemiluminescent light source and said means to support said sticky landing surface also supports said light source.

9. A trap for catching insects as claimed in claim 1 wherein said light source comprises a tritium tube light source and said means to support said sticky landing surface also supports said light source.

10. A trap for catching insects as claimed in claim 1 wherein said means to support said sticky landing surface also supports said light source, said insects comprise wingless, non-flying insects such as fleas, said luring color is a color attractive to said wingless, non-flying insects and said means to support said sticky landing surface makes said sticky landing surface accessible to said wingless, non-flying insects.

11. An insect trap as claimed in claim 1 wherein said sticky landing surface provides plural sticky landing surface areas and said means to support said sticky landing surface supports all of said plural sticky landing surface areas so as to be accessible to said insects.

12. An insect trap as claimed in claim 1 wherein said means to support said sticky landing surface comprises a portable open sided housing with a bottom wall supporting said sticky landing surface, a top cover supporting said light source therebeneath, and with said top cover being spaced above said bottom wall.

13. An insect trap as claimed in claim 1 wherein said means to support said sticky landing surface comprises a housing having an open front and adapted or recessed installation in a room wall structure, said light source is supported on said housing above said open front, and said sticky landing surface rests on said housing below said open front.

14. A trap for catching insects, comprising:
(a) a self-contained source of radiation productive of a gradually decaying form of light initially visible to the human eye and of a color attractive to the insects to be trapped and continuously operative for some predetermined time; and
(b) means for supporting said light source near an area having insects intended to be trapped and at an elevation suited to the nature of such insects; and
(c) means located near said source of radiation and accessible to the insects to be trapped for trapping and holding such of those insects as are attracted to the light radiated by said self-contained source.

15. A trap for catching insects as claimed in claim 14 wherein said self-contained source comprises a chemiluminescent light source.

16. A trap for catching insects as claimed in claim 14 wherein said self-contained source comprises a tritium tube light source.

17. A trap for catching insects as claimed in claim 14 wherein said self-contained light source comprises a tritium gas phosphor activated type light source.

18. A trap for catching insects as claimed in claim 14 including means to reflect said light toward said trapping means.

19. A trap for catching insects as claimed in claim 15 wherein said chemiluminescent light source is of a tubular form and said means for supporting said light source permits said light source to radiate in various directions from the outer peripheral surface thereof.

20. A trap for catching insects as claimed in claim 16 wherein said means for supporting said light source permits said light source to radiate in various directions from the outer peripheral surface thereof.

* * * * *